United States Patent
Fondaco

(10) Patent No.: US 11,864,566 B2
(45) Date of Patent: Jan. 9, 2024

(54) PLANT-BASED FROZEN CONFECTION

(71) Applicant: Conopco, Inc., Englewood Cliffs, NJ (US)

(72) Inventor: Derrick Anthony Fondaco, River Vale, NJ (US)

(73) Assignee: Conopco, Inc., Englewood Cliffs, NJ (US)

( * ) Notice: Subject to any disclaimer, the term of this patent is extended or adjusted under 35 U.S.C. 154(b) by 379 days.

(21) Appl. No.: 17/190,087

(22) Filed: Mar. 2, 2021

(65) Prior Publication Data

US 2022/0279811 A1   Sep. 8, 2022

(51) Int. Cl.
| | |
|---|---|
| *A23G 9/28* | (2006.01) |
| *A23G 9/38* | (2006.01) |
| *A23G 9/32* | (2006.01) |
| *A23L 33/185* | (2016.01) |
| *A23G 9/42* | (2006.01) |
| *A23G 9/34* | (2006.01) |

(52) U.S. Cl.
CPC .............. *A23G 9/38* (2013.01); *A23G 9/327* (2013.01); *A23G 9/34* (2013.01); *A23G 9/42* (2013.01); *A23L 33/185* (2016.08)

(58) Field of Classification Search
None
See application file for complete search history.

(56) References Cited

U.S. PATENT DOCUMENTS

| | | | |
|---|---|---|---|
| 2009/0169700 A1* | 7/2009 | Lin ...................... | A23C 9/1322 426/656 |
| 2011/0171360 A1* | 7/2011 | Sabbagh ............... | A23L 33/185 426/654 |
| 2018/0160703 A1* | 6/2018 | Wix ....................... | A23G 9/327 |
| 2019/0000112 A1* | 1/2019 | Kizer .................... | A23L 33/185 |

FOREIGN PATENT DOCUMENTS

| | | |
|---|---|---|
| EP | 1967077 A2 | 10/2008 |
| WO | WO2012016816 | 2/2012 |

OTHER PUBLICATIONS

Streit, "10 Impressive Health Benefits of Fava Beans". Available online as of Dec. 6, 2018 from https://www.healthline.com/nutrition/fava-beans. pp. 1-18. (Year: 2018).*
Search Report and Written Opinion in EP21160218; dated Jul. 28, 2021.
Search Report and Written Opinion in PCTEP2022051771; dated May 13, 2022.
Search Report and Written Opinion in EP22190209; dated Jan. 30, 2023.

* cited by examiner

*Primary Examiner* — Jenna A Watts
(74) *Attorney, Agent, or Firm* — Gerard J. McGowan, Jr.

(57) ABSTRACT

The present invention relates to a plant-based frozen confection comprising: fat in an amount of 1 to 15 wt %; sugars in an amount of 10 to 30 wt %; and pulse protein in an amount of 0.4 to 10 wt %; wherein the pulse protein comprises soy protein and fava bean protein in a weight ratio of 1:1 to 1:4.

11 Claims, No Drawings

PLANT-BASED FROZEN CONFECTION

FIELD OF THE INVENTION

The invention relates to plant-based frozen confections, in particular to the use of specific blends of plant-based proteins in plant-based frozen confections.

BACKGROUND OF THE INVENTION

Plant-based foods are a growing consumer trend, which is thought to be driven by increasing health and environmental consciousness. As a result, there is currently an increased consumer demand for frozen confections which are not based on dairy ingredients, and instead use plant-based alternatives.

Frozen confections where some or all of the dairy ingredients have been replaced with plant-based ingredients are commercially available. For instance, pulse protein (such as soy protein or pea protein) is becoming more widely used in frozen confections. However, the flavour and texture of frozen confections formulated with certain pulse proteins is still unappealing to some consumers. In particular, their widespread acceptance is hindered by issues around their taste, since pulse proteins tend to have an inherent taste that formulators must mask in order to create a neutral product base. In addition, consumers want frozen confections that are dairy-free, but with the creamy mouthfeel and texture of regular ice cream.

The molecular structures of plant proteins are very different from those of dairy proteins, and a number of technical challenges may occur when formulating plant-based frozen confections. One such challenge is maintaining a suitable mix viscosity over time, since the difference in protein structures tends to mean that the viscosity is higher in plant-based premixes than in dairy premixes—especially after ageing of the premixes. Another challenge relates to texture and mouthfeel, since milk proteins stabilise the partial coalescence of the fat phase and maintain small air bubbles in frozen confections.

Therefore, there remains a need for improved formulations for plant-based frozen confections which overcome one or more of the drawbacks associated with the current formulations.

SUMMARY OF THE INVENTION

The inventors have found that improved plant-based frozen confections can be provided by using a particular ratio of soy protein to fava bean protein. Thus, the present invention is directed to a plant-based frozen confection comprising: fat in an amount of 1 to 15 wt %; sugars in an amount of 10 to 30 wt %; and plant protein in an amount of 0.4 to 10 wt %; wherein the plant protein comprises soy protein (S) and fava bean protein (F) in a weight ratio (S:F) of 1:1 to 1:4.

DETAILED DESCRIPTION OF THE INVENTION

The present invention relates to a plant-based frozen confection. As used herein the term frozen confection means a confection intended for consumption in the frozen state (i.e. where the temperature of the confection is less than 0° C., and preferably where the confection comprises significant amounts of ice). Definitions of various terms and techniques used in frozen confection manufacture are found in Ice Cream by H. Douglas Goff and Richard W. Hartel (2013, 7$^{th}$ Edition, ISBN 978-1-4614-6096-1).

As used herein the term plant-based means that the frozen confection is formulated primarily from plant-derived ingredients. Nevertheless, it will be appreciated that the plant-based frozen confection may be fortified with vitamins and/or minerals or flavoured with ingredients (such as honey) which are not strictly speaking derived from plants. Preferably at least 98% by dry weight of the ingredients are derived from plants, more preferably at least 99%, at least 99.5%, at least 99.9%, most preferably 100% by dry weight of the ingredients are derived from plants. In particular, it is preferred that the frozen confection is essentially free of animal-derived ingredients, and thus comprises animal-derived ingredients in an amount of less than 0.1 wt %, preferably less than 0.05 wt %, more preferably less than 0.01 wt %.

The frozen confection comprises plant protein in an amount of 0.4 to 10 wt %, wherein the plant protein comprises soy protein (S) and fava bean protein (F) in a weight ratio (S:F) of 1:1 to 1:4. Preferably the weight ratio (S:F) is 1:1 to 1:3.5, 1:1 to 1:3, 1:1.2 to 1:4, 1:1.2 to 1:3.5, 1:1.2 to 1:3, 1:1.4 to 1:4, 1:1.4 to 1:3.5, or even 1:1.4 to 1:3. The combination of soy protein and fava bean protein is thought to be better at maintaining the microstructure of the frozen confection than fava bean protein alone.

Since high levels of plant protein are associated with undesirable mouthfeel characteristics (such as grittiness), it is preferred that the frozen confection comprises the plant protein in an amount of 8 wt % or less, 6 wt % or less, 5 wt % or less, or even 4 wt % or less. The frozen confection preferably comprises the plant protein in an amount of at least 0.5 wt %, at least 0.6 wt %, at least 0.7 wt %, or even at least 0.8 wt %. Most preferably, the frozen confection comprises pulse protein in an amount of 0.9 wt % to 2 wt %.

As set out above, the combination of soy protein and fava bean protein is thought to be better at maintaining the microstructure of the frozen confection than fava bean protein alone. However, high levels of soy protein are best avoided since they are associated with undesirable flavour notes. The amount of soy protein (S) in the frozen confection is preferably at least 0.18 wt %, at least 0.2 wt %, at least 0.24 wt %, or even at least 0.3 wt %. The amount of soy protein (S) in the frozen confection is preferably no more than 2 wt %, no more than 1.5 wt %, no more than 1 wt %, or even no more than 0.5 wt %. The amount of fava bean protein (F) in the frozen confection is preferably at least 0.4 wt %, at least 0.45 wt %, at least 0.5 wt %, or even at least 0.55 wt %. The amount of fava bean protein (F) in the frozen confection is preferably no more than 6.5 wt %, no more than 5 wt %, no more than 3 wt %, or even no more than 1.5 wt %.

It is possible for the frozen confection to additionally comprise cereal protein (such as oat protein, wheat protein, rye protein, barley protein, rice protein, buckwheat protein, millet protein and mixtures thereof).

Preferably at least 50 wt % of the plant protein is pulse protein, more preferably at least 70 wt %, at least 80 wt %, or even at least 90 wt %. It is particularly preferred that 100 wt % of the plant protein is pulse protein. For example, where the soy protein and the fava bean protein are the only plant proteins in the frozen confection.

Since the frozen confection is a plant-based frozen confection, it is preferred that the frozen confection is substantially free of dairy ingredients including milk protein. As used herein "substantially free of" means that the frozen confection comprises the ingredient in question in an amount of less than 0.1 wt %, preferably less than 0.05 wt %, more preferably less than 0.01 wt %.

The frozen confection comprises fat in an amount of 1 wt % to 15 wt %, and preferably in an amount of from 2 wt % to 12 wt %, 3 wt % to 10 wt %, or even from 4 wt % to 8 wt %. The fat is preferably vegetable fat (such as coconut oil, palm oil, palm kernel oil, or a mixture thereof), and it is particularly preferred that the fat is coconut oil.

The frozen confection comprises sugars in an amount of 10 wt % to 30 wt %. Sugars are used in almost all types of frozen confection and have two major functions: delivering sweetness and controlling the amount of ice. As used herein the term "sugars" includes monosaccharides, disaccharides and oligosaccharides (which are formed from 3 to 10 monosaccharide units). Monosaccharides include glucose, fructose, galactose and mannose. Disaccharides include sucrose, lactose and trehalose. Oligosaccharides include raffinose. The term "sugars" does not include polysaccharides, which comprise >10 monosaccharides. Some ingredients commonly included in frozen confections may contribute to the amount of sugars. For example, corn syrup (sometimes called glucose syrup)—a mixture of monosaccharides, disaccharides and oligosaccharides—is included. However, maltodextrin (a mixture of polysaccharides) is not included.

High concentrations of sugars may contribute unwanted sweetness and or calories to the frozen confection. Therefore, the amount of sugars in the frozen confection is no more than 30 wt %, preferably no more than 28 wt %, no more than 25 wt %, or no more than 22 wt %. Conversely, low concentrations of sugars may be inappropriate if the frozen confection is a scoopable product, since a low concentration of sugars tend to result in frozen confections with a high ice content. Therefore, the amount of sugars in the frozen confection is at least 10 wt %, preferably at least 12 wt %, at least 15 wt %, or at least 20 wt %.

The frozen confection of the present invention preferably comprises soluble fibre in an amount of 1.4 wt % to 15 wt %. The soluble fibre is usually derived from the grains of cereal crops, such as corn (also called maize), wheat, rice, barley or oats. The soluble fibre is preferably soluble corn fibre. Soluble corn fibre is commercially available, for example from Tate & Lyle under the Promitor® brand. Additionally or alternatively, the soluble fibre may be polydextrose (commercially available, for example from Tate & Lyle under the STA-LITE® brand) or maltodextrin having a dextrose equivalent (DE) of less than 20 (commercially available, for example from Cargill).

Whilst nutritionally speaking stabilisers are sometimes considered to be a source of soluble fibre, they are not encompassed by the term "soluble fibre" as used herein. Thus, for the purpose of the present application, none of the following are considered to be soluble fibre: alginates (E400-E405), carrageenan (E407), locust bean gum (E410), guar gum (E412), pectin (E440), xanthan gum (E415) and sodium carboxymethyl cellulose (E466).

The frozen confection preferably comprises soluble fibre in an amount of at least 1.6 wt %, at least 1.8 wt %, or even at least 2 wt %. The frozen confection preferably comprises soluble fibre in an amount of no more than 12 wt %, no more than 10 wt %, no more than 8 wt %, or even no more than 5 wt %.

It is preferred than the soluble fibre contains less than 10 wt % of saccharides (i.e. monosaccharides, disaccharides and oligosaccharides). The soluble fibre preferably comprises less than 8 wt %, less than 5 wt %, or even less than 2 wt % of saccharides.

The frozen confection may additionally comprise nut solids, preferably in an amount of 1 wt % to 8 wt %, 1.5 wt % to 5 wt %, or even 2 wt % to 4 wt %. Preferred sources of nut solids include almonds, cashews, coconuts, pecans, macadamia nuts, brazil nuts, hazelnuts, pistachios, and mixtures thereof. Almond or coconut solids are preferred. Where present, the nut solids are preferably added in the form of nut paste or nut butter.

The frozen confection preferably comprises an emulsifier or a mixture of emulsifiers such as mon-diglycerides and the like). For example, the frozen confection may comprise emulsifier in an amount of 0.05 wt % to 1 wt %, 0.1 wt % to 0.8 wt %, or 0.2 wt % to 0.5 wt %.

Although not essential, the frozen confection typically comprises at least one stabiliser, which is preferably selected from the group consisting of locust bean gum, xanthan gum, guar gum, carrageenan, and mixtures thereof (for example, a mixture of locust bean gum and guar gum). The amount of stabiliser in the frozen confection is preferably 0.05 wt % to 1 wt %, 0.1 wt % to 0.8 wt %, or 0.2 wt % to 0.5 wt %.

The frozen confection may optionally comprise nonnutritive sweetener, such as aspartame, acesulfame K, erythritol, sucralose, or one or more steviol glycosides such as rebaudioside A. Mixtures of two or more non-nutritive sweeteners may also be used.

The frozen confection may optionally comprise colours and/or flavours.

The frozen confection is preferably aerated. As used herein the term "aerated" means that the confection has an overrun of at least 30%. Preferably the frozen confection has an overrun of 50% to 150%, 70% to 140%, or even 80% to 120%. Overrun (with unit "%") is defined by the following equation:

$$\text{overrun} = \frac{\text{volume of aerated product} - \text{volume of initial mix}}{\text{Volume of initial mix}} \times 100\%$$

Overrun is measured at ambient temperature (20° C.) and atmospheric pressure.

The frozen confection may optionally comprise further components, which include but are not limited to: inclusions, sauces, and/or toppings.

The frozen confections of the present invention can be manufactured by any suitable method. The frozen confection is typically made by freezing a premix (preferably a pasteurised premix) of ingredients such as water, fat, freezing point depressant, plant protein (comprising the soy protein and fava bean protein), and optionally other ingredients such as emulsifiers, stabilisers, colours and flavours. Further components (where present) are usually added after the premix has been frozen.

Numerical ranges expressed in the format "from x to y" are understood to include x and y, and in specifying any range of values or amounts, any particular upper value or amount can be associated with any particular lower value or amount. Unless otherwise specified, wt % refers to weight percent based on the weight of the entire formulation (including water).

Except in the examples and comparative experiments, or where otherwise explicitly indicated, all numbers are to be understood as modified by the word "about". As used herein, the indefinite article "a" or "an" and its corresponding definite article "the" means at least one, or one or more, unless specified otherwise.

EXAMPLES

The examples are intended to illustrate the invention and are not intended to limit the invention to those examples per se.

Rheology Procedure

To determine the impact of mix thickening on the formulations, viscosity measurements were obtained. Samples were tested using a TA Instruments A2000 Rheometer with a sandblasted concentric cylinder geometry. The procedure for obtaining the viscosity measurements used a shear rate sweep from $0.01\ s^{-1}$ to $1000\ s^{-1}$ at 5° C. The mixes were tested after being aged for 24 hours at 4° C. (and, where appropriate, at further 24 hour intervals). The viscosity curves were compared to a benchmark curve for a sample mix which was known to be have an acceptable viscosity for factory production and to a benchmark curve for a sample mix which was too viscous for factory production.

Example 1

Plant-based frozen confection formulations were made according to the formulations in Table 1. Samples A and B contained pea protein, and Samples C, D and E contained fava bean protein. The specified protein level (P) is the amount of protein provided by the pea protein source (80% protein content) or the fava bean protein source (60% protein content). The sugars were a combination of sucrose, fructose and corn syrup.

Briefly, the ingredients (excluding coconut oil) were combined and mixed with heating (60° C. to 75° C.), followed by addition of the coconut oil and further mixing. The mixes were pasteurised and homogenised, and then aged for 24 hours at 4° C.

After the ageing step, the mixes were aerated in a scraped surface heat exchanger (standard ice cream freezer). The air input was controlled to give a target overrun of 100%, and freezing was controlled to give a target extrusion temperature of −10° C.

TABLE 1 plant-based frozen confection formulations

| Ingredient (wt %) | Sample A | B | C | D | E |
| --- | --- | --- | --- | --- | --- |
| Coconut oil | 6.5 | 5 | 5 | 5 | 5 |
| Pea protein source | 1.5 | 1.2 | — | — | — |
| Fava bean protein source | — | — | 2.0 | 1.6 | 1.2 |
| Sugars | 23.5 | 22 | 18.5 | 18.5 | 18.5 |
| Soluble corn fibre | — | — | 2.3 | 2.7 | 3.1 |
| Emulsifier | 0.4 | 0.1 | 0.15 | 0.15 | 0.15 |
| Stabilizer | 0.3 | 0.3 | 0.16 | 0.16 | 0.16 |
| Cocoa powder | 3 | 4 | 3.6 | 3.6 | 3.6 |
| Almond paste | 2 | — | — | — | — |
| Water | to 100 | to 100 | to 100 | to 100 | to 100 |
| Protein (P) | 1.2 | 0.96 | 1.2 | 0.96 | 0.72 |

Samples A and B exhibited excessive mix thickening, and were judged to be too viscous for successful large-scale manufacture of frozen confection in a factory. None of Samples C, D and E exhibited significant mix thickening, and all of three of these samples were judged to have suitable viscosities for factory production. However, these formulations (Samples C, D and E) did not produce frozen confections with the desired overrun. Additionally, the frozen confections had poor visual appearance.

Example 2

Plant-based frozen confection formulations using different ratios of soy protein and fava bean protein were made according to the formulations in Table 2. The specified soy protein amount (S) is the amount of protein provided by the soy protein source (90% protein content). Similarly, the specified fava bean protein amount (F) is the amount of protein provided by the fava bean protein source (60% protein content). The sugars were a combination of sucrose and fructose.

Briefly, the ingredients (excluding coconut oil) were combined and mixed with heating (60° C. to 75° C.), followed by addition of the coconut oil and further mixing. The mixes were pasteurised and homogenised, and then aged for 24 hours at 4° C.

After the ageing step, the mixes were aerated in a scraped surface heat exchanger (standard ice cream freezer). The air input was controlled to give a target overrun of 100%, and freezing was controlled to give a target extrusion temperature of −10° C.

TABLE 2 plant-based frozen confection formulations

| Ingredient (wt %) | Sample 1 | 2 | 3 | 4 | 5 |
| --- | --- | --- | --- | --- | --- |
| Coconut oil | 5 | 5 | 5 | 5 | 5 |
| Soy protein source | 0.2 | 0.4 | 0.48 | 0.36 | 0.48 |
| Fava bean protein source | 1.2 | 0.9 | 1.2 | 1.2 | 1.05 |
| Sugars | 18.5 | 18.5 | 18 | 18 | 18 |
| Soluble corn fibre | 2.9 | 2.9 | 2.1 | 2.2 | 2.2 |
| Emulsifier | 0.15 | 0.15 | 0.15 | 0.15 | 0.15 |
| Stabilizer | 0.16 | 0.16 | 0.16 | 0.16 | 0.16 |
| Cocoa powder | 3.6 | 3.6 | 3.6 | 3.6 | 3.6 |
| Almond paste | — | — | 2 | 2 | 2 |
| Water | to 100 | to 100 | to 100 | to 100 | to 100 |
| Soy protein (S) | 0.18 | 0.36 | 0.43 | 0.32 | 0.43 |
| Fava bean protein (F) | 0.72 | 0.54 | 0.72 | 0.72 | 0.63 |
| (S):(F) | 1:4 | 1:1.5 | 1:1.67 | 1:2.22 | 1:1.46 |

None of Samples 1 to 5 exhibited significant mix thickening, and all five of these samples were judged to have suitable viscosities for factory production. In addition, all of the formulations in Table 2 produced frozen confections with the desired overrun. Sample 1 had some minor visual issues with regard to appearance, and was judged to represent the limit of the ratio of soy protein to fava bean protein. Samples 2 to 5 all had acceptable visual appearances.

The invention claimed is:
1. A plant-based frozen confection comprising:
fat in an amount of 1 to 15 wt %;
sugars in an amount of 10 to 30 wt %; and
plant protein in an amount of 0.4 to 10 wt %;
wherein the plant protein comprises soy protein (S) and fava bean protein (F) in a weight ratio (S:F) of 1:1 to 1:4.

2. The plant-based frozen confection according to claim 1, wherein the weight ratio of soy protein to fava bean protein is 1:1.4 to 1:3.

3. The plant-based frozen confection according to claim 1, wherein the frozen confection has an overrun of 50% to 150%.

4. The plant-based frozen confection according to claim 1, wherein the frozen confection additionally comprises nut solids in an amount of 1 wt % to 8 wt %.

5. The plant-based frozen confection according to claim 4, wherein the nut solids are almond solids or coconut solids.

6. The plant-based frozen confection according to claim 1, wherein the amount of fat is 4 wt % to 8 wt %.

7. The plant-based frozen confection according to claim 1, wherein the frozen confection additionally comprises soluble fibre in an amount of 1.4 wt % to 15 wt %.

8. The plant-based frozen confection according to claim 1, wherein the frozen confection comprises soy protein (S) in an amount of 0.18 wt to 2 wt %.

9. The plant-based frozen confection according to claim 1, wherein the frozen confection comprises fava bean protein (F) in an amount of 0.4 wt % to 6.5 wt %.

10. The plant-based frozen confection according to claim 1, wherein 70 wt % to 100 wt % of the plant protein is pulse protein.

11. The plant-based frozen confection according to claim 1, wherein the plant protein additionally comprises cereal protein.

\* \* \* \* \*